(No Model.)

E. N. DICKERSON, Jr.
APPARATUS FOR ELECTRICAL CONVERSION.

No. 431,879. Patented July 8, 1890.

Witnesses:
Wm. A. Pollock
H. Coutant

Inventor:
E N Dickerson

UNITED STATES PATENT OFFICE.

EDWARD N. DICKERSON, JR., OF NEW YORK, N. Y.

APPARATUS FOR ELECTRICAL CONVERSION.

SPECIFICATION forming part of Letters Patent No. 431,879, dated July 8, 1890.

Application filed March 9, 1888. Serial No. 266,676. (No model.)

*To all whom it may concern:*

Be it known that I, EDWARD N. DICKERSON, Jr., of the city, county, and State of New York, have invented a new and useful Improvement in Apparatus for Electrical Conversion, of which the following is a full, true, and exact description, reference being had to the accompanying drawings.

This invention relates to an improvement upon the apparatus shown in Letters Patent of the United States granted to myself February 14, 1888, No. 377,994; and by means of it a high-tension direct current can be converted into a low-tension direct current.

My invention will be readily understood from the accompanying drawings, in which similar letters refer to similar parts.

Figure 1:
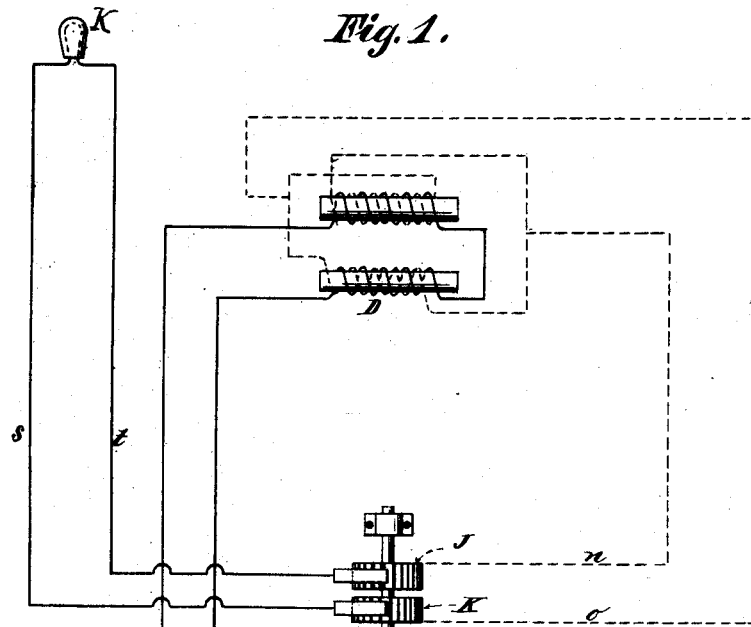
Figure 2:
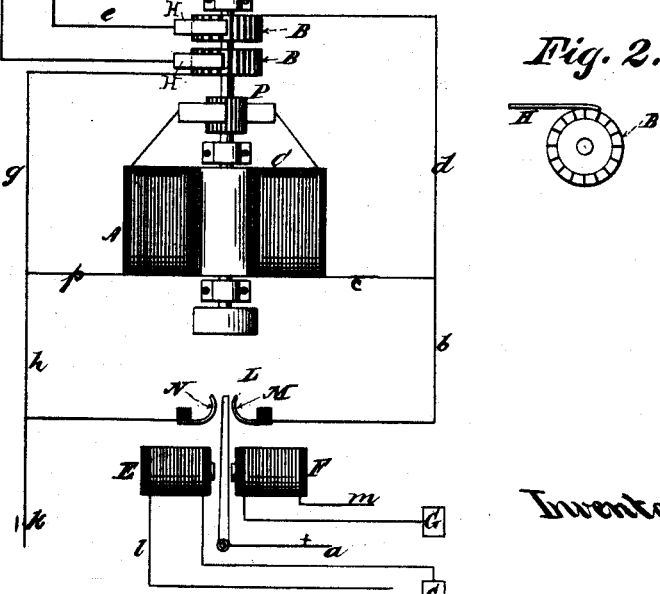

Figure 1 represents a view of the main-circuit system and Fig. 2 a detail view of the commutator.

A high-tension current flows out upon the circuit $a$ and returns to the generator by the circuit $k$. By the switch L it passes to the spring M. Thence by the circuit $b\ c\ p\ h\ k$ it passes through the motor C, which is operated by its own commutator P, in the usual manner. On the shaft of this motor is arranged the double reversing-commutator B B, the sections of which are alternately connected, as shown, one set of sections being connected with the circuit $d$ and the other with the circuit $g$. The commutator-springs are made just broad enough to lap two sections, so as to prevent the breaking of the current, and these commutator-springs H H connect with the circuits $e\ f$, which go to the Westinghouse converter D.

In the drawings the lap of the springs H is shown greater than need be. It is sufficient that the contact of these springs be simply great enough to span the insulation. It is obvious that other forms of reversing-commutator could be employed. It is obvious that the current upon the circuits $e\ f$ is a high-tension reversing-current, and therefore will operate the converter D, which further converts a reversing high-tension current into a reversing low-tension current, which, when rectified, passes out in the secondary circuit $s\ t$, and may be used to light the incandescent light K. This converter and motor are supposed to be located together, by preference, without a house, and the circuit $n\ o$ enters the house.

A switch E F puts the apparatus in operation. If the switch be held to the left by the magnet E the high-tension current passes directly by the switch L, spring N, to the circuit $k$ without passing into the apparatus. Under these circumstances a second current is sent through the wire $l$ to ground G. If this second current is sent through the wire $m$ to ground G, then the switch L is thrown against spring M, and then the current passes by the wire $a$ to the junction between $b$ and $c$. The resistance of the motor A, which acts as a shunt-resistance, forces the desired proportion of current by the wire $d$ through the reversing-switch, the circuit $e$ and $f$, and circuit $g$ back to the generator. In case it is not desired to use this shunt device, the motor can be operated by an independent current entering by the wire $p\ c$, which would then be disconnected from the main circuit. The difference between these two arrangements is one of economy merely, two circuits being required in the latter case. It is obvious of course that the switch E F may be omitted; but by it I am enabled to throw any house into circuit from the central office.

Upon the circuits $e f$ an alternating current is discharged, which passes through a primary coil of the converter D. From this an induced alternating current proceeds upon the circuits $n\ o$, which lead to the reversing-commutator J K, which may be of course of any desired form, and I show it merely of the form indicated for convenience in explanation. By this reversing-commutator the reversing-currents coming in upon the circuits $n\ o$ are rectified and pass out upon the circuit $s\ t$, where they are employed to do the work required. It is important for plating purposes and for running motors that the current shall not be reversing. It is of course essential that the two commutators shall move synchronously, and the commutator J K should be so adjusted on the shaft as to allow for the time required by the converter D. The peculiar arrangement shown prevents substantial sparking on the commutators. It will be observed that the time of reversal on the commutator J K is substantially synchronous with the time of reversal of the commutator B B, and therefore at a time of practically no current.

What I claim as my invention, and desire to secure by Letters Patent, is—

1. The combination of a main circuit $a\,k$, a motor C, driven through circuits $p\,c$, derived from main circuit $a\,k$, the commutator B B reversing the main circuit through circuits $e\,f$, the converter D in the circuit $e\,f$, the commutator J K reversing the circuit $n\,o$, which is the secondary circuit of the converter D, the said commutators B B and J K moving synchronously, and the rectified-circuit $s\,t$ from commutator J K, substantially as described.

2. The combination of the motor C, having its commutator P and reversing-commutator B B, and a straightening-commutator J K, all located upon the shaft of the motor, substantially as described.

3. The combination of the motor C, driven on main circuit $a\,k$, the commutators P B B and J K upon the shaft of the motor C, the circuit $e\,f$ from commutator B B to converter D, the converter D, the circuit $n\,o$ from converter D to commutator J K, and the working-circuit $s\,t$ from the commutator J K, substantially as described.

In testimony whereof I have signed my name to this specification in the presence of two subscribing witnesses.

E. N. DICKERSON, Jr.

Witnesses:
ANTHONY GREF,
WM. A. POLLOCK.